United States Patent [19]

Ballester

[11] Patent Number: 5,579,861

[45] Date of Patent: Dec. 3, 1996

[54] POWER STEERING CASING CAPABLE OF OPERATING IN A POWER-ASSIST MODE AND ALSO CAPABLE OF OPERATING IN A STRICTLY MECHANICAL MODE

[75] Inventor: Adrián J. Ballester, Buenos Aires, Argentina

[73] Assignee: Trinter S.A.C.I.F., Buenos Aires, Argentina

[21] Appl. No.: 344,667

[22] Filed: Nov. 22, 1994

(Under 37 CFR 1.47)

[51] Int. Cl.⁶ .............................. B62D 5/22; B62D 6/00
[52] U.S. Cl. .................................. 180/422; 91/375 A
[58] Field of Search .................................. 180/132, 141, 180/142, 143, 146, 147; 91/375 A, 375 R, 374

[56] References Cited

U.S. PATENT DOCUMENTS

| | | | |
|---|---|---|---|
| 5,241,893 | 9/1993 | Guasch et al. | 180/141 X |
| 5,291,963 | 3/1994 | Sangret | 180/141 |
| 5,357,845 | 10/1994 | Sangret | 180/141 X |

*Primary Examiner*—Kevin T. Hurley
*Attorney, Agent, or Firm*—Jacobson, Price, Holman & Stern, PLLC

[57] ABSTRACT

A power steering casing capable of operating in a power-assist mode and also capable of operating in a strictly mechanical mode. The power steering casing includes an inner cylinder where there is disposed a piston affixed to an end of a rack bar. The rack bar projects outside of the steering casing for connection to steering linkage of the vehicle. The steering casing is in communication with a valve which controls the passage of a power-assistance fluid in response to turning of a steering wheel. The valve comprises a jacket and a valvular nucleus. The valvular nucleus is connected to the vehicle's steering column, while the jacket is connected to a bushing on the pinion. The pinion meshes with the rack bar. The bushing is connected, via an anchorage piece and pin, to a torque bar that coaxially extend through the valvular nucleus from the bushing to the steering column. Relative rotation of the valvular nucleus with respect to the valvular jacket permits hydraulic fluid to flow through the casing and thereby provides power assistance to the steering effort. Such relative rotation between the valvular nucleus and the jacket is selectively prevented by a blocking dowel which selectively locks the torque bar, via its anchorage piece, to the bushing and valvular nucleus so that all of these elements rotate together for direct transmission of steering wheel rotation to the pinion of the rack bar. The blocking dowel selectively prevents the relative rotation in response to vehicle speed and the amount of torque on the steering wheel.

5 Claims, 3 Drawing Sheets

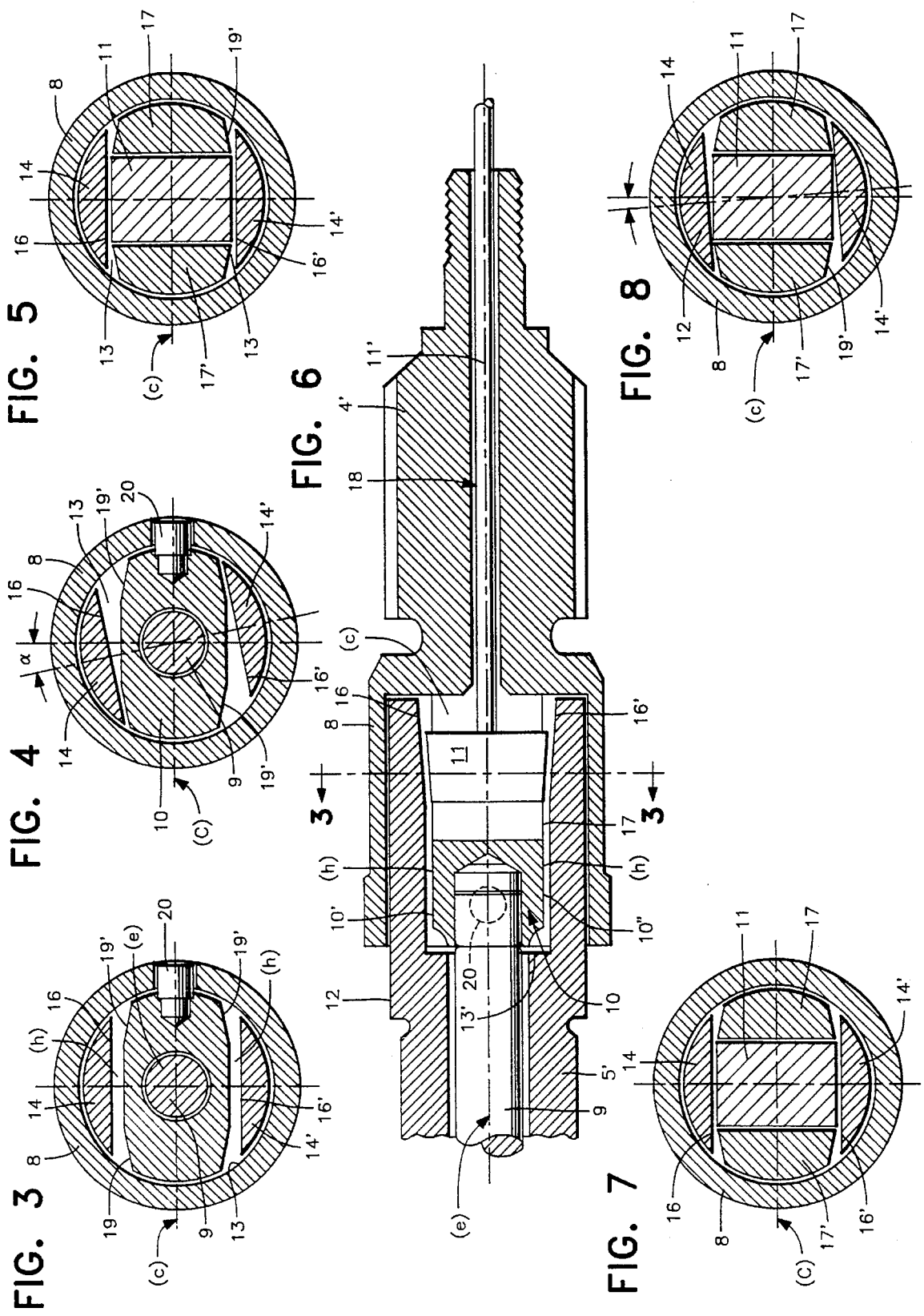

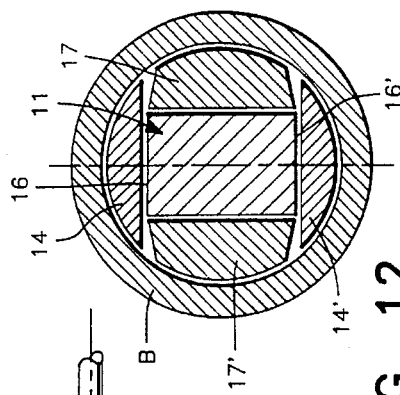
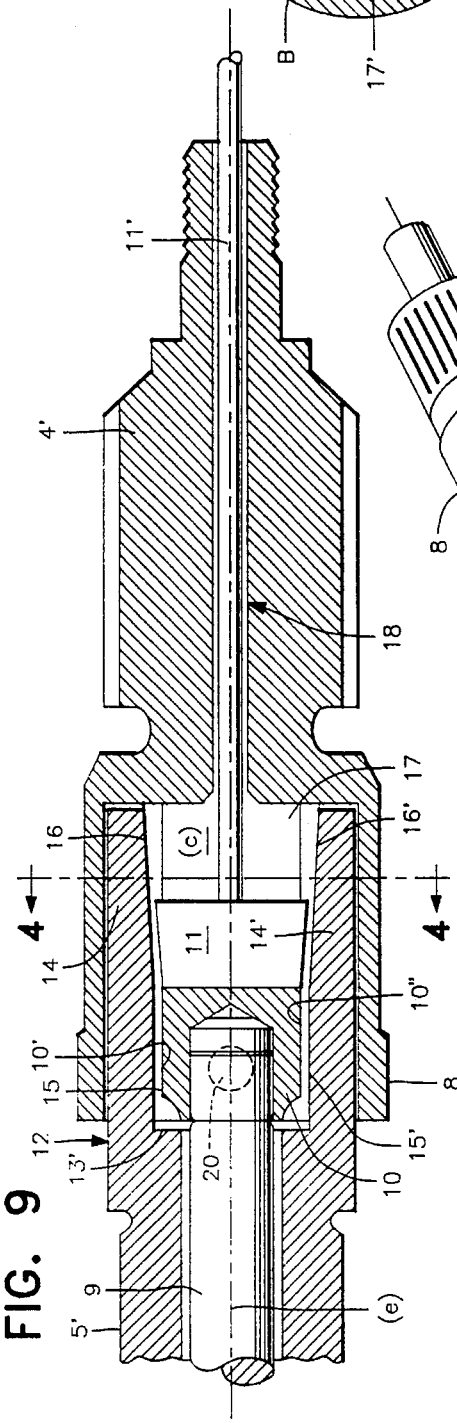
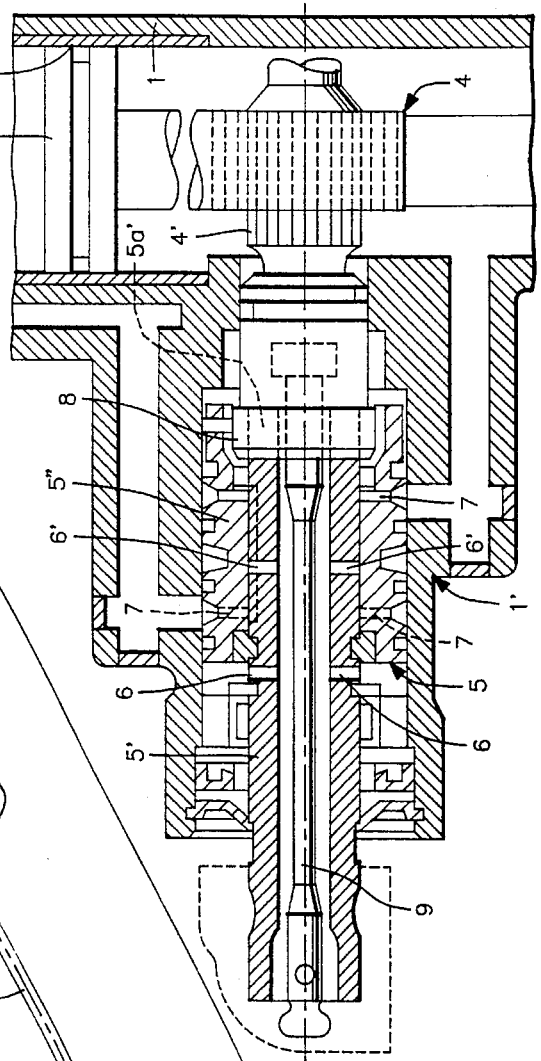

POWER STEERING CASING CAPABLE OF OPERATING IN A POWER-ASSIST MODE AND ALSO CAPABLE OF OPERATING IN A STRICTLY MECHANICAL MODE

BACKGROUND OF THE INVENTION

The present invention relates to improvements in power steering cases for steering mechanisms of automotive vehicles, particularly to power steering cases which automatically operate in a completely mechanical mode when the vehicle reaches a predetermined speed, preferably a high speed, with the aim of preventing overassistance of the driver which endangers the maneuverability of the vehicle.

Already well known in practice are the power steering cases for steering mechanisms or servosteering which reduce the effort necessary to turn the steering wheel, especially when the vehicle is stopped, is being parked, or is otherwise being steered at low speeds. These mechanisms work in a manner similar to a conventional gear steering wheel, with the difference that it has a piston solidly connected to the rack bar that is driven, in one or the other direction, by a fluid under pressure selectively supplied through a valve which is integrally formed to the pinion, whose automatic command is carried out by the driver when turning the steering wheel, in each maneuver he makes.

Although these power cases comply with the specific end to which they are directed, especially at low speeds, they also provide help that is detrimental at high speeds where overassistance of the driver occurs. During such overassistance, a sudden maneuver may cause the driver to lose control over the vehicle. This continuous assistance provided by the power steering cases of the steering mechanisms is a source of worry for their manufacturers, who have tried hitherto unsuccessfully, to solve this problem. To this end, functional modifications have been made to these cases, the modifications being limited to controlling the passage of fluid through its distribution valve in order to reduce the assistance effect or to regulate selectively the work of the pressure fluid pump to reduce the supply of fluid; but in all cases the steering mechanisms maintain, to a greater or lesser degree, the assistance to the driver, which means that the above problem subsists at high speeds.

The ideal solution to the problem consists of modifying the power steering mechanisms so that they respond as a power steering case at low speeds, and as an entirely mechanical steering case at high speeds, so that their optimal performance is obtained.

Accordingly, it is an object of the present invention to provide a power steering case for steering mechanisms, which power steering case provides steering assistance until a speed higher than a predetermined value is reached. The power steering case also includes means for progressively and gradually diminishing the angular interplay of the valvular nucleus of the power steering case and of the pinion until power assistance ceases, so as to constitute in this manner an integral assembly between all the components of the power steering case, functioning as a conventional mechanical steering mechanism.

In order to fully interpret the solution proposed, it is advisable to review summarily the structural and functional features of a conventional power steering case, as the one shown in FIG. 12 of the drawings.

A case of this type comprises, in general, a steering casing (1) inside of which a cylinder (2) is incorporated. The cylinder (2) is hermetically closed at one end and a piston (3) is mounted in the cylinder (2). The piston (3) is fixed to the end of a rack bar (4) which is coaxial to the casing (1) and which extends beyond the cylinder (2) to remain operatively related to the vehicle's steering linkage, not shown in the figures, which integrates the steering mechanism with the power steering case.

The casing (1) comprises a case body (1') wherein a valve (5) is mounted for controlling the passage of a fluid under pressure. The valve (5) is constituted by an axle or valvular nucleus (5') rotatably supported inside the case body (1') and by a jacket (5") which is coaxial with the nucleus (5').

The nucleus (5') has orifices (6) in its upper part which communicate with the supply circuit of fluid under pressure and with the interior of the axle or nucleus (5'). The nucleus (5') also has orifices (6') directed toward the jacket (5"). The jacket (5") presents passages (7) for the fluid which communicate, while the power steering case is functioning, with the interior of the nucleus (5'), and which also communicate, by means of conduits, with opposite sides of the piston (3) to provide the power assistance during steering maneuvers.

The axle or nucleus (5') has an upper end portion attached to the column of the steering wheel and a toothed lower end portion (5'a) which meshes with a toothed interior of a bushing (8) mounted in the case (1').

Between the toothed lower end portion (5'a) and the toothed interior of the bushing (8), there is a clearance which allows the nucleus (5') of the valve (5) to have an angular movement at the base of the bushing (8). A pinion (4') projects from the nucleus (5') and is meshed with rack bar (4), the bushing (8) being connected to the jacket (5") of valve 5.

In the interior of the axle or nucleus (5'), coaxial to the same, there is mounted a torque bar (9), affixed at one end to the upper end portion of the axle or nucleus (5'), and at its opposite end to the base of bushing (8) which, in turn, is connected to jacket (5").

The manner of operating this conventional power steering case starts when the steering wheel is turned and the movement is transmitted to the pinion (4') through the torque bar (9). The twisting of the torque bar (9) causes a slight difference in the displacement of the valvular nucleus (5') with respect to the pinion (4'), which difference is reflected in the position of the valvular nucleus (5') relative to the jacket (5") of valve (5), thus permitting the passing of fluid under pressure to one or the other side of the piston (3) of the rack bar (4), thereby obtaining power assistance for the steering effort.

SUMMARY OF THE INVENTION

The present invention proposes improvements in a conventional power steering case such as the one described above, which basically encompass incorporating a mechanism for eliminating the clearance, which permits angular rotation provided by the torque bar.

This mechanism forms an integral part of the power steering case and has a gradual blocking member for the torque bar which is the means which selectively permits the angular rotation of the valvular nucleus with an approximate magnitude of 7°, in one or the other turning direction of the wheel.

The blocking member of the torque bar can interfere axially or transversally with the torque bar, and is related to an actuator of a command device, which is preferably electronically sensitive to command signals of a speed sensor which senses the speed of the vehicle's wheels and to signals of a torque effort sensor of the steering wheel.

The mechanism therefore automatically responds to certain values or parameters, such as speed or torque, by causing a gradual blocking of the torque bar, which blocking begins at a predetermined speed. The blocking continues until total rigidity is achieved, so as to form in this manner with the remaining components of the steering case a solid assembly. A conventional mechanical steering case is therefore achieved in response to a signal generated by the speed sensor of the vehicle's wheels; and from this first mode of operation, the mechanism will again operate as a power steering case by providing restitution of the hydraulic assistance in response to a torque value generated by the driver when executing a sudden maneuver at high speeds. In this second mode of operation, the torque signal provokes the unblocking of the torque bar.

In its practical realization, the improvements of the invention comprise an anchorage piece at the end of the torque bar opposite to the end of the torque bar which is affixed to the valvular nucleus. The anchorage piece acts as a means for limiting the angular clearance which permits rotation of the valvular nucleus and has a generally rectilinear U-shaped body with an indentation at the distal side opposite to that affixed to the torque bar. The anchorage piece further includes opposite surfaces with lateral bevels which, in turn, determine the limitation of the angular clearance which permits rotation of the valvular nucleus.

The anchorage piece remains laterally connected in a solid manner by a pin to the bushing holder of the pinion, and is loosely confined in a recess formed in a cylindrical end part of the valvular nucleus. The recess in the cylindrical end part of the valvular nucleus defines a pair of symmetrical portions arranged symmetrically with respect to the geometric axis of the valvular nucleus. The recess is concentrically arranged in the bushing, while the free angular clearance of the symmetrical portions of the valvular nucleus is limited by the anchorage piece of the torque bar. The anchorage piece remains against the bottom of the recess of the valvular nucleus, with flat and parallel surfaces of the anchorage piece facing the inner faces of the symmetrical portions at the cylindrical end part of the valvular nucleus. The cylindrical end part also includes distal diverging surfaces towards the free ends of the symmetrical portions. The diverging surfaces define a distal conical inner surface in the recess. The distal conical inner surface is laterally limited by lateral faces of the indentation in the anchorage piece which are angularly displaced at 90° with respect to the symmetrical portions at the cylindrical end part of the valvular nucleus.

The recess in the valvular nucleus and the indentation formed in the anchorage piece define between one another a guide space for a blocking dowel associated with the anchorage piece. The blocking dowel is solidly connected to the end of a rod which is coaxial to the pinion, and is disposed for free axial displacement in a passage defined in the pinion. The rod extends from the bottom of the bushing to the end of a rotating pinion support and projects beyond the steering case.

The blocking dowel associated with the anchorage piece has a pair of opposite inclined faces with a rate of incline corresponding to that of the distal diverging surfaces of the valvular nucleus. The blocking dowel also has a pair of flat and parallel surfaces facing the inner faces of the anchorage piece defined in the indentation of the anchorage piece. Thus, the angular clearance of the valvular nucleus is gradually limited by axial displacement of the dowel, and is totally eliminated when the diverging surfaces of the valvular nucleus and the inclined faces of the dowel bear against one another. The dowel, through the rod, is controlled by an electronic device which, in turn, is responsive to a speed sensor for detecting the speed of the vehicle's wheels and a torque sensor for detecting the torque on the steering wheel.

There is no doubt that the improvements proposed provide a variable system of power steering that functions as a power steering case at low speeds and as a conventional mechanical case at high speeds, with the ability to immediately return the power assistance at high speeds in response to a sudden maneuver to elude an obstacle.

Therefore, the present invention relates to improvements in power steering cases for steering mechanisms of automotive vehicles, of the type which comprise a steering casing which has an inner cylinder, where there is placed a piston affixed to the end of a rack bar, wherein the rack bar extends coaxially to the casing and projects outwardly of it, to remain connected to an articulated arm of a vehicle's steering linkage. The casing is in communication with a housing body of a distributor valve for a hydraulic assistance fluid. The valve is responsive to turning of the steering wheel and includes a tubular shaft or valvular nucleus having an upper end portion connected to the steering column of the vehicle and having orifices of entry and return for the fluid, in communication with a supply source thereof. The valve also includes a jacket which is concentric with the valvular nucleus and which presents orifices that selectively establish fluid communication between passages of the case fluidly connected to opposite sides of the piston and the supply source through ports in the valvular nucleus in response to turning of the steering wheel. The lower portion of the valvular nucleus is disposed concentrically in a bushing which is mounted in the case and which is connected to the jacket. This lower portion of the valvular nucleus is located in this bushing and is rotatable in opposite directions in response to being impelled by a torque bar when turning of the steering wheel occurs. The torque bar is connected by its end to the valvular nucleus and is arranged coaxially with respect thereto. The bushing is solidly connected to a pinion disposed in meshed relation with the rack bar. The end of the torque bar opposite to that which is connected to the valvular nucleus is solidly connected to an anchorage piece mounted inside the bushing. The anchorage piece is laterally connected to the bushing and is located in the bottom of the recess made in the cylindrical end part of the valvular nucleus. The anchorage piece is concentrically disposed in the bushing. The recess presents surfaces slightly spaced and facing opposite faces of the anchorage piece, the lateral edges of which constitute means for limiting the angular displacement of the valvular nucleus in both turning directions whenever hydraulic assistance is being provided by the mechanism. Mounted inside the bushing is a blocking dowel for the torque bar. The blocking dowel is mounted in a displaceable manner and is connected to a control device therefor. The control device is responsive to the speed of the vehicle's wheels and to the torque exerted on the steering wheel. The dowel is capable of gradually diminishing the angular clearance in the valvular nucleus so as to constitute with the torque bar and valvular nucleus an integral mechanical unit for the direct transmission of the steering wheel's rotation to the pinion and the rack bar. The invention has other accessory objects which will be understood in the course of the present specification.

BRIEF DESCRIPTION OF THE DRAWINGS

For the present invention to be clearly understood and easily put into practice, it has been depicted as an example and in one of its preferred forms of realization, in the drawings attached to the present specification and in which:

FIG. 3 illustrates a cross section along line 1—1 of FIG. 2, showing the valvular nucleus of the case in a steering position without power assistance.

FIG. 4 represents a cross section similar to that of FIG. 3, showing the angular clearance of the nucleus, in response to turning of the steering wheel actuated by the torque bar.

FIG. 5 represents a cross section through line II—II of FIG. 2, showing the blocking dowel for the anchorage piece of the bar, between the conical surfaces of the valvular nucleus, and its clearance or space towards these surfaces.

FIG. 6 illustrates a similar view to that of FIG. 2, showing the blocking dowel for the anchorage piece in an intermediate point of its travel, that is, gradually diminishing the angular clearance which permits rotation of the torque bar.

FIGS. 7 and 8 represent cross sections through line III—III of FIG. 6, showing a reduction of the space between the blocking dowel for the anchorage piece and the conical surfaces of the valvular nucleus which causes a reduction of the power assistance.

FIG. 9 represents a view of the mechanism of the present invention showing the dowel in the blocking position which blocks rotation of the anchorage piece of the torque bar.

FIG. 10 represents a cross section through line IV—IV of FIG. 9, showing the dowel in a totally blocking position without clearance at the diverging portion of the valvular nucleus.

FIG. 11 illustrates a perspective exploded view of various parts of the mechanism according to the invention.

Finally, FIG. 12 represents a conventional power steering case showing the components thereof, for a better interpretation of the invention. In all the drawings mentioned, the same reference numbers indicate equal or corresponding parts.

DESCRIPTION OF THE PREFERRED EMBODIMENTS

Figure 1:
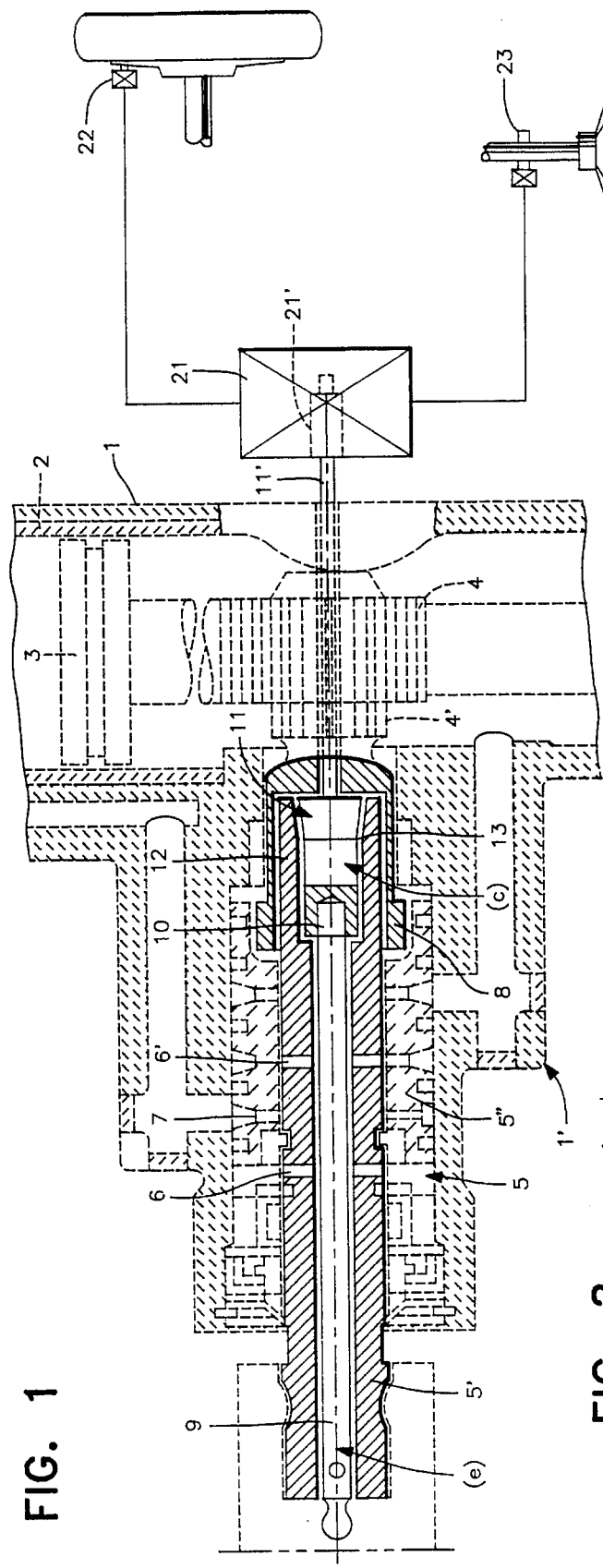
FIG. 1 represents a sectioned view of a power steering case which incorporates the improvements of the present invention.

As illustrated in FIGS. 1 to 11, the improvements proposed by the present invention have been incorporated into a conventional power steering case such as that represented in FIG. 12, and comprise an anchorage piece (10) of the torque bar (9) located at the end of the torque bar opposite to that of its attachment to the valvular nucleus (5'), the anchorage piece (10) being limitative of the angular clearance which permits rotation of the valvular nucleus (5'). The improvement further comprises a blocking dowel (11) for the anchorage piece (10) mounted at the end of a rod (11') which is, in turn, coaxially mounted with free axial displacement in the bushing (8), of which the pinion (4') forms an integral part. The improvement further includes a valvular nucleus (5') with a cylindrical end portion (12) subdivided longitudinally by a recess (13). The recess (13) forms, in the cylindrical end portion (12) portions, portions (14—14') symmetrically arranged with respect to the geommetric axis (e) of the valvular nucleus (5').

These portions (14—14') of the valvular nucleus (5') present respective faces symmetrically opposed with respect to the axis (c) and constituted by flat surfaces (15—15') which are parallel to one another and which start at the bottom (13') of the recess (13), which bottom (13') is bisected by the torque bar (9). The portions (14—14') also include corresponding diverging planar surfaces (16—16') which define a distal conical inner surface in the valvular nucleus (5') between the portions (14—14').

The anchorage piece (10) of the torque bar (9) is constituted by a generally rectilinear U-shaped body having free branches (17—17') which are separated by an indentation (18). The free branches (17—17') include parallel inner faces which are perpendicular to an inner face of the medial branch (19). The medial branch (19) is anchored to the end of the torque bar (9).

The anchorage piece (10) has a thickness or height slightly smaller than the distance separating the flat and parallel surfaces (15—15') in the recess (13). Likewise, the faces (10'—10") which face toward the surfaces (15—15') are also planar and parallel, but have bevelled longitudinal edges (19'). The anchorage piece (10) is mounted against the bottom (13') of the recess (13) and is connected laterally by a pin (20) to the bushing (8) of the power steering case. The faces (10'—10") of the anchorage piece (10) and the flat surfaces (15—15') of recess (13) define respective spaces (h) there between. As can be seen in FIGS. 2 to 6, the portions (14—14') of the cylindrical end portion (12) of the valvular nucleus (5') remain supported against the bottom of bushing (8). The portions (14—14'), together with their respective diverging planar surfaces (16—16') are combined with the free branches (17—17') of the anchorage piece (10) to form a cavity (c), wherein the portions (14—14') and the branches (17—17') are mutually displaced at 90°.

These diverging planar surfaces (16—16') and the inner surfaces of the branches (17—17') constitute a longitudinal guide for the dowel (11). The dowel (11), in turn, presents lateral inclined faces which complement the diverging planar surfaces (16—16') of the portions (14—14'), and parallel faces which are arranged parallel to the parallel inner faces of the free branches (17—17').

The inclined faces of the dowel (11) facing the diverging planar surfaces (16—16') present the same general incline as the diverging planar surfaces (16—16'), so that the dowel (11) at the extreme or end position of its travel fits tightly between both diverging planar surfaces (16—16') and so that when it is positioned at the distal end of the portions (14—14'), the dowel (11) provides clearances or spaces (h') between itself and the diverging planar surfaces (16—16').

The dowel (11) is solidly connected to the end of a rod (11'). The rod (11') is arranged for free axial displacement in a passage (18) which extends from the bottom of the bushing (8) in the pinion (4') and coaxially with the bushing (8). The rod (11') projects beyond the driving case (1) for connection to selective positioning means of the dowel (11) in the cavity (c), which positioning means respond to the speed of the vehicle's wheels and the torque exerted on the steering wheel. The selective positioning means, designated by reference number (21) in FIG. 1, may be achieved using various combinations of individual components, and are not critical to the invention.

As an example, they can be constructed using an electronic device which comprises an actuator (21) which is preferably electromagnetic and governed by the output of a circuit signal comparator, not represented in detail, with inputs connected to a speed sensor (22) for detecting the speed of the vehicle's wheels, and to a sensor (23) for detecting the torque on the steering wheel (v) of the steering column which, in turn, is connected to the valvular nucleus (5').

The preferred operation of the improvements incorporated in the power steering case which transforms it selectively into a mechanical steering case includes the following:

During normal movement of the vehicle in a straight line, the valve (5) is in a disabled state, so that no hydraulic assistance is provided. In particular, the passages which hydraulically connect the hydraulic circuit with opposite sides of the piston (3) affixed to the rack bar (4) are blocked between the valvular nucleus (5') and the jacket (5") of the valve (5).

Figure 2:
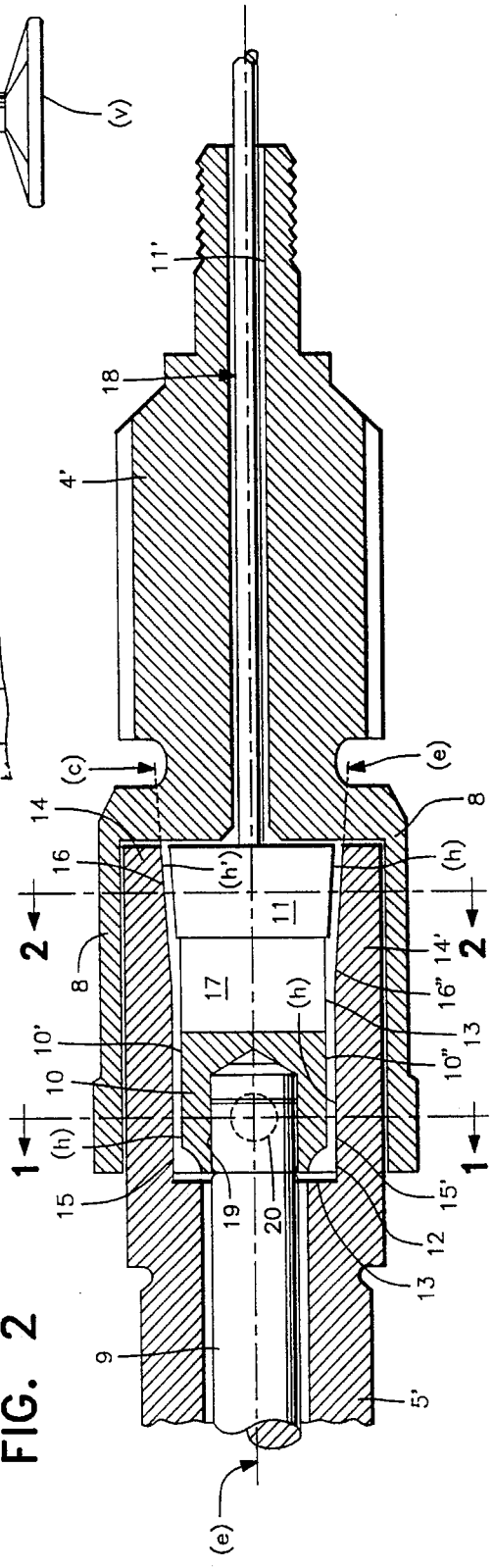
FIG. 2 represents a detail in larger scale of the mechanism of the invention which blocks the torque bar to eliminate the angular clearance of the valvular nucleus; the mechanism is represented in a disabled position, so that the power steering case provides hydraulic assistance.

As illustrated in FIG. 2, the dowel (11) is positioned in the posterior end of cavity (c) so that its inclined faces are separated from the diverging planar surfaces (16—16') by the clearances or spaces (h'). In this position, the power steering case functions in a conventional manner so that when the steering wheel turns in one or the other direction, the steering effort is transmitted to the pinion (4') through torque bar (9).

Since the torque bar (9) is secured by its upper end to the valvular nucleus (5'), the torsion on the torque bar (9) causes an angular displacement of the valvular nucleus (5') (FIG. 4). This angular displacement is limited by anchorage piece (10) of the torque bar, in such a manner that the portions (14—14') of the cylindrical end portion (12) of the nucleus (5') are displaced angularly (approximately 7°), thereby permitting the bevels (19') of the anchorage piece (10) to effect this angular displacement ($\alpha$). The angular displacement is limited in both directions to the same magnitude so that communication of passages between the nucleus (5') and the jacket (5") is achieved to thereby allow the passing of the power assistance fluid to the steering casing (1).

As for high speeds in light maneuvers, a conventional power steering case would maintain its functionality and the driver would be overassisted in his driving. It is in this situation that the improvements proposed by the present invention would transform the power-assisted steering case into a mechanical steering case or box.

To this end, the speed sensor (22) generates, starting from a predetermined speed, a command signal which is provided to the actuator (21). This causes the displacement of the rod (11') (FIG. 6) and consequently of the dowel (11) along the cavity (c) between the diverging planar surfaces (16—16') in a gradual manner. The angle ($\alpha$) is thereby progressively reduced until the dowel (11) reaches the posterior area of the cavity (a) (FIG. 9) wherein the inclined faces of the dowel (11) and the diverging planar surfaces (16—16') of the portions (14—14') of the nucleus (5'), engage each other tightly, while the parallel inner faces of the anchorage piece (10) of the torque bar (9) engage the parallel faces of the dowel (11).

In this position of the dowel (11), an integral unit is formed in the steering case, where the valvular nucleus (5'), the jacket (5"), the bushing (8) with its pinion (4'), the anchorage piece (10) and the torque bar (9), operate together as a mechanical steering case because the torque bar (9) is blocked, which means that the hydraulic assistance is annuled by the disappearance of the angular clearance in the valvular nucleus (5'). In this abutted position of the dowel (11) with the vehicle travelling at a high rate of speed, if the driver makes a sudden maneuver which signifies a torque effort superior to a predetermined value of the torque sensor (23), the torque sensor (23) generates a command signal which is applied to the actuator (21). The actuator (21) then deactivates the dowel (11) by retraction of the rod (11'), thereby converting the steering case again into a power steering case.

Although the blocking of the valvular nucleus (5') and of the torque bar (9) is carried out axially, it can also be done transversally to the torque bar (9).

The invention, as explained above, is clearly understandable and does not require any further explanation for experts. The present invention is clearly determined in the following claims.

Having thus particularly described and determined the nature of the present invention and the manner in which it has to be carried into practice, I declare that what is claimed as exclusive property and invention, is:

1. A power steering casing for a steering mechanism of an automotive vehicle of the type which comprises an inner cylinder where there is disposed a piston affixed to an end of a rack bar, wherein the rack bar extends coaxially with respect to said steering casing and projects outside of the steering casing for connection to steering linkage of the vehicle, said steering casing being in communication with a housing body of a valve for controlling passage of a power-assistance fluid in response to turning of a steering wheel, said valve comprising:

a valvular nucleus having an upper end portion connected to a steering column of the vehicle and also having inlet and return orifices for said fluid in communication with a supply source of said fluid; and a jacket which is concentric to said valvular nucleus and which presents additional orifices that selectively establish fluid communication between passages of the casing in communication with opposite sides of said piston and the supply source through said orifices of the valvular nucleus in response to turning of the steering wheel;

a lower portion of the valvular nucleus being concentrically disposed in relation to a bushing, said bushing being mounted in said steering casing and being connected to said jacket, said lower portion of the valvular nucleus being disposed in the bushing for free angular movement with respect thereto, in opposite directions, in response to torsion on a torque bar when turning of the steering wheel occurs;

said torque bar having first and second ends connected respectively to said valvular nucleus and to the bushing, said torque bar extending through the valvular nucleus in a coaxial manner, the bushing being solidly connected to a pinion disposed in meshed relation with said rack bar, wherein:

the second end of the torque bar is solidly connected to an anchorage piece for said torque bar, said anchorage piece being mounted inside the bushing and being laterally connected to the bushing, said anchorage piece being located in a bottom of a recess which is formed in a cylindrical end portion of the valvular nucleus, said anchorage piece being concentrically disposed in said bushing, said recess being defined between oppositely facing surfaces of the cylindrical end portion, said anchorage piece having lateral edges arranged so as to limit the angular displacement of the valvular nucleus in both turning directions thereof when power assistance is being provided by the mechanism;

said bushing having a displaceable blocking member for the torque bar, said blocking member being connected to a command device which is responsive to the vehicle's wheel speed and to torque exerted on the steering wheel, said blocking member being capable of gradually reducing an angular clearance with the valvular nucleus to form with the torque bar and said valvular nucleus an integral mechanical unit for direct transmission of steering wheel rotation to the pinion of the rack bar.

2. The power steering casing in accordance with claim 1, wherein said anchorage piece includes a rectilinear U-shaped body having generally parallel planar faces with bevelled lateral edges; said generally parallel planar faces being slightly spaced from said oppositely facing surfaces of the cylindric end portion, said torque bar being solidly connected to an anterior end face of the rectilinear U-shaped body, said rectilinear U-shaped body having a posterior end face which is bisected by an indentation, said indentation defining a pair of branches with inner parallel surfaces which are perpendicular to a bottom surface of the indentation, said rectilinear U-shaped body being laterally connected by a pin to an inner wall of the bushing.

3. The power steering casing in accordance with claim 1, wherein the recess in the cylindrical end portion defines a pair of longitudinally extending symmetrical portions angularly displaced at 90° with respect to branches of the anchorage piece, said oppositely facing surfaces of the cylindrical end portion being defined on said longitudinally extending symmetrical portions of the valvular nucleus and being directed toward said anchorage piece, said cylindrical end portion further comprising diverging planar surfaces which diverge at distal ends of said longitudinally extending symmetrical portions, said diverging planar surfaces constituting in combination with inner surfaces of the branches of the anchorage piece guide means for the blocking member, said blocking member being mounted in an axially displaceable manner relative to the valvular nucleus.

4. The power steering casing in accordance with claim 1, wherein said blocking member is constituted by a rectilinear dowel body affixed to an end of a rod, said rod being axially displaceable in a passage which is formed coaxially through the pinion and which extends from a bottom of the bushing to a distal end of the pinion, said rod projecting beyond the steering casing for connection to said command device.

5. The power steering casing in accordance with claim 4, wherein said rectilinear dowel body remains mounted between branches of the anchorage piece, and between diverging planar surfaces distally arranged on the cylindrical end portion of the valvular nucleus, said rectilinear dowel body presenting lateral flat and parallel faces opposite inner surfaces of the branches and complementary inclined faces which face the diverging planar surfaces of the cylindrical end portion, said rectilinear dowel body being arranged so that:

when said inclined surfaces are brought tightly against said diverging planar surfaces, said rectilinear dowel body prevents relative rotation of said valvular nucleus with respect to said second end of the torque bar so that said valvular nucleus and said torque bar form an integral mechanical unit for direct transmission of steering wheel rotation to the pinion of the rack bar; and when said inclined surfaces are not tightly against said diverging planar surfaces, relative rotation of said valvular nucleus is permitted with respect to said second end of the torque bar, thereby enabling said power assistance.

* * * * *